Dec. 30, 1958  J. L. RUSSELL  2,866,877
ELECTRICAL TRANSDUCER
Filed June 1, 1954  2 Sheets-Sheet 1
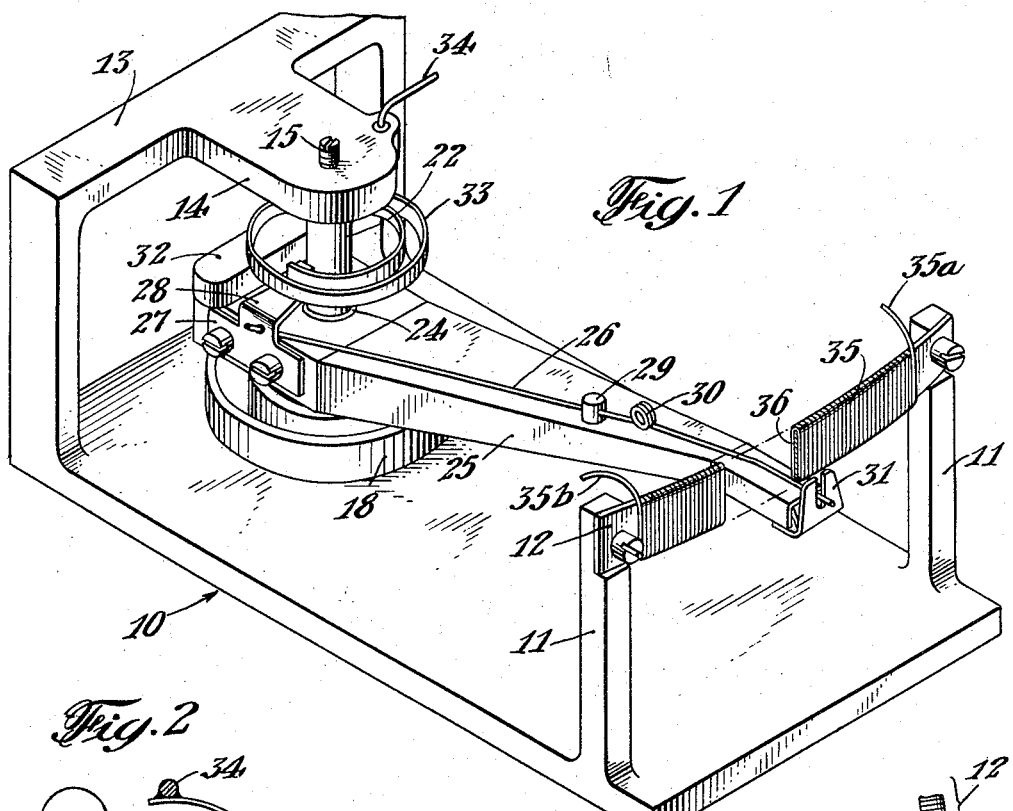
Fig. 1
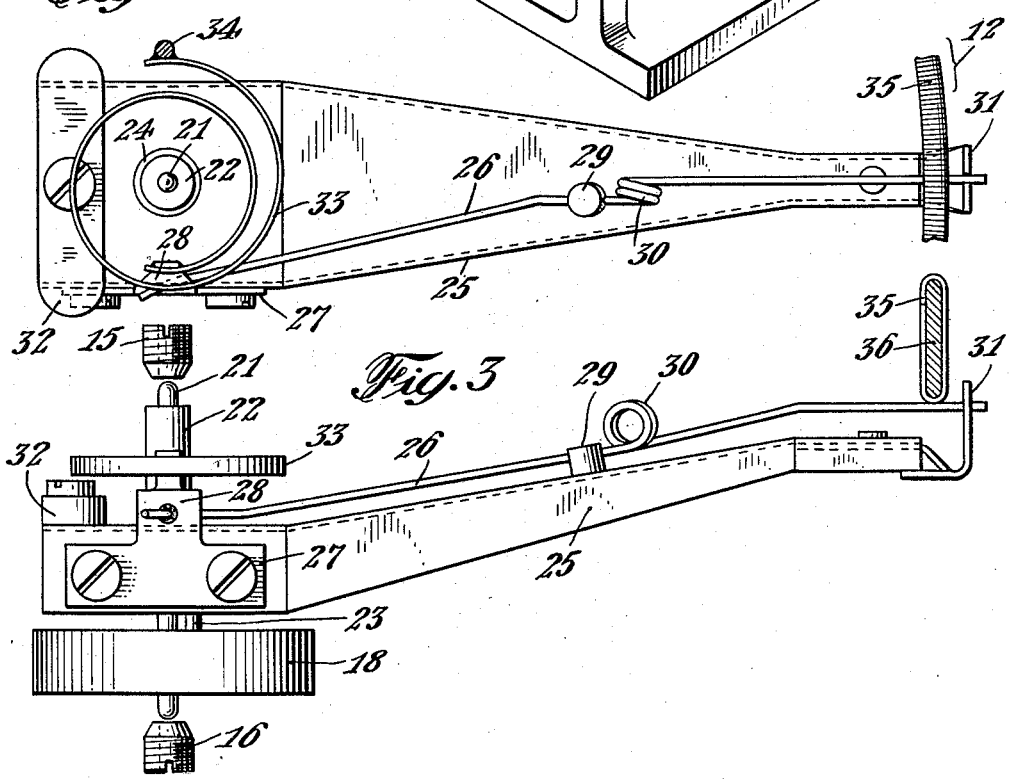
Fig. 2
Fig. 3

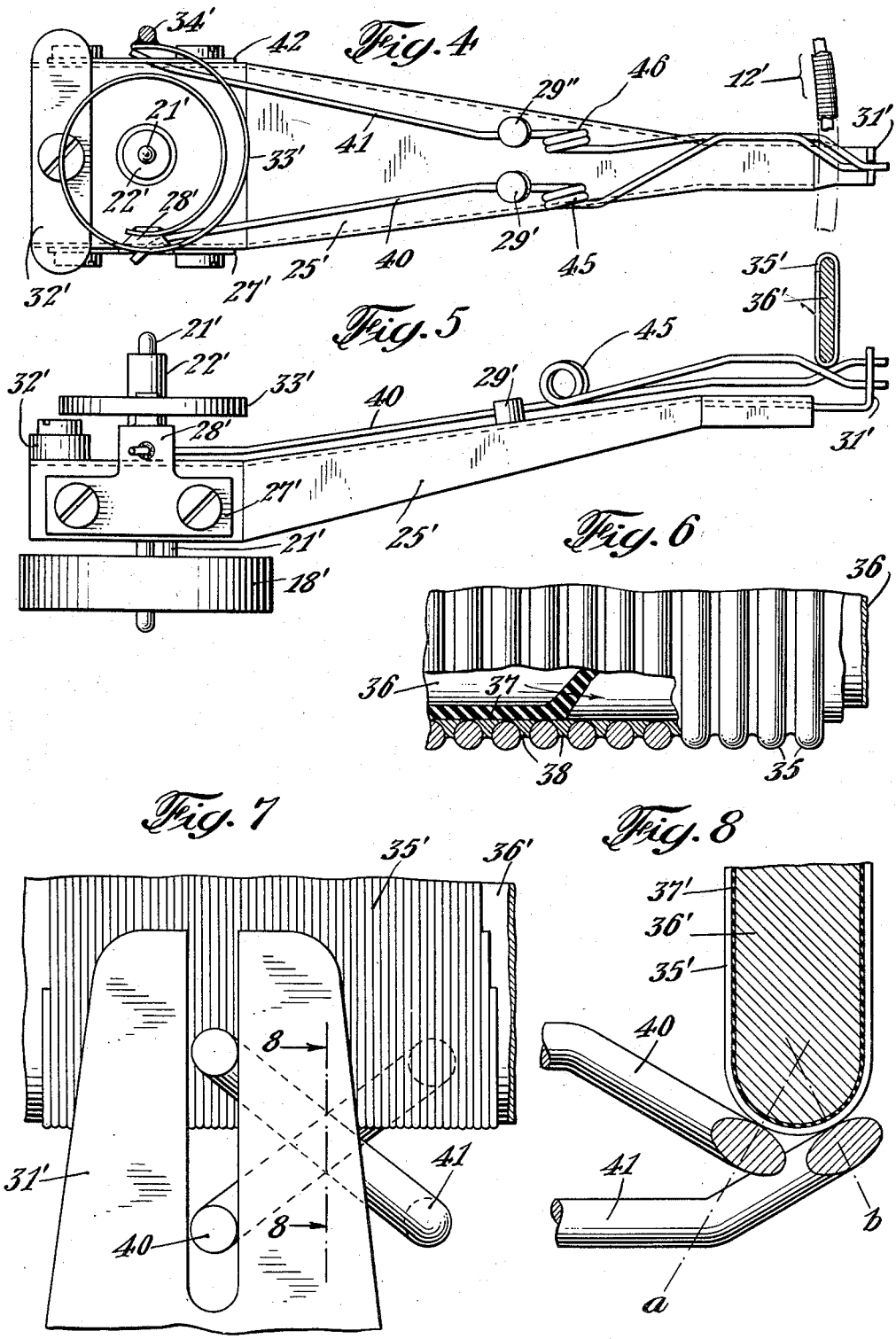

United States Patent Office 2,866,877
Patented Dec. 30, 1958

2,866,877

ELECTRICAL TRANSDUCER

John L. Russell, Naugatuck, Conn., assignor to The Bristol Company, Waterbury, Conn., a corporation of Connecticut Application June 1, 1954, Serial No. 433,491

15 Claims. (Cl. 201—48)

This invention relates to transducers and more particularly to a mechanical-electrical transducer and rheostat therefor capable of accurate performance under widely varying and adverse physical conditions.

Mechanical-electrical transducers which vary an electrical resistance or the relative apportioning of resistance values in associated parts of an electric circuit have long been in use in electrical measurement of mechanical displacements, and more especially in the art of telemetering. However, there is an ever increasing need for such a device capable of operating with precision under exceedingly rigorous conditions. This is especially the case in the mobile field where communication between a mobile transmitting station and a receiving station is customarily effected through a radio link. The problems involved will be more readily appreciated when it is understood that such devices are required for use in high altitude, high-speed aircraft, involving as they do, among other things, rapid changes in acceleration and attitude, together with sustained and intense vibration through a wide range of frequencies. These devices are subjected, also, to rapid and extreme variations of temperature, and it is important that such conditions not adversely affect either the accuracy or the structure of the apparatus. The transducer, therefore, must be light in weight, compact and rugged, requiring a minimum of space, and at the same time functioning with the required degree of precision in the face of most unfavorable conditions as normally encountered in such service.

The rheostat, voltage-divider, or slide-wire assembly which is an essential part of such transducers constitutes a component most likely to be adversely affected by these conditions. Extreme heat or cold, or rapid temperature variations are potential sources of trouble. Mechanical shocks resulting from rapid changes in acceleration, position and high-frequency vibration introduce serious problems, since, to attain the degree of precision required, the contact brush which sweeps over the wire resistor of the rheostat must not only maintain continuous contact therewith but must also do so with a substantially uniform contact pressure since otherwise the output of the transducer may vary with these as well as other disturbances. It has been found, moreover, that in assembling and adjusting such devices, it is of paramount importance that both the absolute and the relative magnitudes of contact pressures between the brushes and the slide-wires be known and be subject to adjustment to certain optimum values.

It is, therefore, a principal object of this invention to provide a mechanical-electrical transducer capable of operation with an enhanced degree of precision in spite of rapidly varying and adverse conditions.

Another object is to provide such a transducer which embodies to an enhanced degree immunity to vibration through a wide range of vibrational frequencies, and at the same time is not adversely affected in its performance by rapid changes in acceleration or position.

A further object is to provide in such a transducer a variable voltage-divider or slide-wire assembly which shall remain structurally and electrically stable under extreme variations of temperature.

A more specific object is to provide rheostat assemblies especially well suited for use in such transducers which preserve to an enhanced degree a predetermined contact resistance without any tendency to open circuits as the movable contacts are translated from point to point along the wire resistors while at the same time having relatively low inherent friction between relatively movable parts and permitting ready measurement and adjustment of the contact pressures of respective brush members upon the resistor elements.

In accordance with this invention there is provided a rheostat sub-assembly including a wire-wound resistor member or slide-wire, with which is adapted to cooperate a brush-support arm mechanically linked to movable means responsive to variations in pressure or other variable whose magnitudes it is desired to reproduce, said arm carrying one or more resilient contact brush members engaging convolutions of said slide-wire in a manner to ensure maximum dependability of electrical contact at predetermined and definite points along said slide-wire when exposed to a variety of diverse and disturbing conditions.

In the drawings:

Fig. 1 is an isometric projection showing the principal elements of a transducer to which the invention is applicable.

Figs. 2 and 3 are top and side elevations, respectively, of a slide-wire and contact-arm assembly having a single-contact element incorporating the principles of the invention.

Figs. 4 and 5 are top and side elevations similar to those of Figs. 2 and 3, respectively, but showing a double-contact element incorporating the principles of the invention.

Fig. 6 is a view, partly in section, and to a greatly enlarged scale, of a slide-wire assembly especially adaptable to the purposes of the invention.

Fig. 7 is a front elevation, showing to an enlarged scale the mode of coaction between the slide-wire element and the form of contact assembly illustrated in Figs. 4 and 5.

Fig. 8 is a side elevation in section taken through the line 8—8 of Fig. 7.

Referring to Figs. 1, 2 and 3 of the drawings:

The numeral 10 (shown only in Fig. 1) designates an elongated base-plate member having near one extremity two upstanding posts 11 adapted to support a slide-wire assembly 12 hereinafter to be more fully described, and at the opposite extremity a frame part 13 including a horizontally projecting bracket member 14 adapted to provide a pivotal support for a deflectable member also to be described in more detail. Said pivotal support comprises vertically disposed and aligned journal screws 15 and 16 (see Fig. 3), the former being centrally located on the bracket member 14 and the latter on the base-plate 10.

Secured to the base-plate 10 is a sensitive element 18 having a portion adapted for arcuate deflection through a limited angle about the axis determined by the journal screws 15 and 16 in response to changes in a variable to be measured. While there is no intention of so limiting the application of the apparatus to which the invention is directed, the element 18 is in the present instance shown as a spiral Bourdon spring deflectable in response to differences in internally and externally applied fluid pressures.

Pivotally supported by the screws 15 and 16, and adapted for angular deflection about the axis determined thereby, is a shaft or spindle 21 having preferably an enlarged hub portion 22. The free extremity of the sensitive element 18 is mechanically linked to the shaft 21 to impart angular displacement thereto. This linkage may be effected either by direct attachment between the element 18 and the shaft 21, or by a pin 23 (shown in Fig. 3) carried by the free end of said element and engaging a portion of the hub 22. Insulatedly carried by the hub 22 is an assembly comprising a brush-arm assembly 25 carrying an extended brush or contact member 26.

The brush-arm 25 is constructed preferably of aluminum alloy or equivalent lightweight metal, and is in the form of a tapered channel section with its web uppermost. A rectangular portion surrounds the hub 22 and is secured thereto by means of an insulating collar or bushing 24. A tapered portion, slightly offset in an axial sense to carry its upper surface further from the base-plate 10, extends radially from the rectangular portion to near the slide-wire 12, where it terminates in a straight radial portion passing beneath said slide-wire. Attached to one side of the brush-arm near the hub 22 is a metal anchor member 27 having a perforated lug 28 through which is passed one extremity of the member 26, now to be described.

The contact member 26 is comprised of a wire of resilient metal having a good degree of electrical conductivity and not readily subject to corrosion or to abnormal wear under sliding conditions. Suitable examples of such metal are found in certain heat-hardening alloys of palladium. The member 26 is secured at one extremity (preferably by soldering) to the anchor member 27, and is extended substantially longitudinally of the brush-arm 25 to provide at its outer extremity a brush surface for engagement with the slide-wire member 12. A definite support or fulcrum for the brush portion of the member 26 is provided by a stud 29 riveted to the upper face of the tapered portion of the brush-arm 25 and perforated to accommodate the wire of said member. The free or cantilever portion of the member 26 extends along above the upper surface of the radial extremity of the brush-arm 25, and is preferably provided with a short coil 30 to confer optimum resiliency upon that portion and to maintain it in firm electrical engagement with the slide-wire 12. The free extremity of the brush-arm 25 carries a guide member 31 having therein a vertically elongated slot through which passes the free end of the brush member 26 with a minimum clearance to provide free movement in a sense perpendicular to the plane of travel of said brush-arm, with negligible displacement relative thereto in a sense parallel to said plane.

In order to minimize the effects of inertia due to rapid accelerations of the assembly in a translatory sense it is desirable that the center of gravity of the brush-arm be made to lie in the axis of rotation. For this purpose there is provided a suitable counterweight 32 secured to the rectangular portion of the arm 25 and having its weight and position so selected as to balance the brush-arm assembly about its axis of rotation.

Electrical connection between the contact member 26 and outside circuits is provided by means of a conductive hair-spring 33 having one end fixed to the lug 28 and the other to a conductive terminal 34 insulatedly supported from the bracket member 14.

To provide the desired degree of compactness, and to secure the necessary over-all resistance, slide-wire assembly 12 comprises a winding 35 on an insulated metallic core. The manner of construction will be understood by reference to Fig. 6. Bare wire is employed; and while its material and size are to some extent subject to operating requirements, excellent performance has been obtained with the alloy known as "Nichrome V" having a diameter of the order of from 0.0012 to 0.0015 inch, providing in the assembly a resistance value of several thousand ohms. The wire is space-wound upon an aluminum core 36 having a relatively heavy layer 37 of oxide electrolytically deposited thereon, and its edges formed to a substantially cylindrical curvature. The spacing of the convolutions of the winding is made slightly greater than the wire diameter, so that adjacent turns are separated by spaces of the order of from 0.0005 to 0.001 inch. The extremities 35a and 35b of the winding 35 may be directly connected to any suitable terminal posts (not shown in the drawings); and these, together with brush terminal 34 may be utilized to provide desired electrical connection to external circuits associated with the transducer.

While the disposition of the wire about its support will be generally of a helical nature, the advance from turn to turn is so small that for practical purposes the curved portion of each convolution as it passes around the narrow edge of the form from one face to the other may be considered as lying in a vertical plane which, when the transducer assembly is complete, will include the axis determined by the journal screws 15—16. After the wire is wound upon the oxide-coated core 36, a resin layer 38, preferably a high-temperature-polymerizing varnish such as silicone, is applied thereto. The resin selected is of the class which tends to form a concave meniscus, as indicated in Fig. 6, between the spaced convolutions of the winding, and which tends to be absorbed into the more or less porous oxide layer 37.

It will be understood that the resin is applied and treated so as to leave the wire partly imbedded, with smooth rounded fillets between the turns thereof, as shown most clearly in Fig. 6, which distribution of the resin tends to immobilize and protect the wire. The natural flow of the properly selected resin under the influence of its surface tension before hardening tends to leave on the outer surface of the wire an extremely thin film, which may readily be removed with a fine abrasive. Thus, the edge of the winding upon which brush 26 bears may be given a high polish conducive to good electrical contact, and also minimizing wear on the brush. Since the electrolytically formed layer of oxide on the aluminum core provides an inorganic insulating base not subject to injury by the temperatures to which the apparatus is normally exposed, there is no tendency to creep or progressive distortion of the winding under such conditions. The wire may thus be adequately tensioned in winding, and will remain so under operating conditions, while the residual stress in the resin is substantially of zero value.

Essentially, the aluminum core 36 is formed to such curvature that the basically cylindrical surface of the wire winding 35 where it passes about the edge of the core becomes a toroid having its major radius substantially identical with the radius of rotation of the contact surface on the brush 26, so that the line of contact between said brush and said winding becomes substantially a circular arc having its center on the axis of rotation of the brush-arm 25. The conformation of the brush wherein the contact surface is a radial line permits a considerable variation in the radius of this curvature. This feature may be advantageously utilized by intentionally introducing a degree of eccentricity whereby to distribute wear along an appreciable length of the brush surface, thus greatly minimizing wear on the brush. Furthermore, within certain limits, the conformation of the line of contact may be established in a manner to compensate for nonlinearity in the characteristic law of the sensitive element 18.

In recapitulation of details thus far set forth, the apparatus described will be observed to possess the following meritorious characteristics:

(1) Noble metal contact on slide-wire with provision for considerable displacement of brush in a sense transverse to its normal travel.

(2) A brush having relatively small mass in contact with slide-wire, whereby to minimize the effect of acceleration, vibration and mechanical shock.

(3) Oxidized metal core eliminates undesirable characteristics of organic materials. Organic (silicone) binder serves principally as a spacer and as a filler to prevent accumulation of foreign material in interstices between and beneath turns of wire. The binder being unstressed is not subject to deformation under conditions of abnormal temperature.

(4) Space-winding of the resistor element virtually eliminates the possibility of short-circuits between adjacent turns.

It will be well understood that dependability of operation of the transducer which has been described will be increased by utilizing two contact members instead of a single brush to engage the slide-wire; but in order to accomplish this effectively it is necessary that certain conditions be fulfilled. For example, the two brushes should engage the slide-wire at substantially equipotential points, viz. they should rest upon a common convolution of the winding and at points thereon separated by a minimum length of resistance wire. They should be similarly constrained to follow the normal deflections of the brush-arm and at the same time be free for independent movement in a sense perpendicular to the plane of deflection in order to maintain individual contact with the slide-wire.

The form of the invention embodying the dual brush arrangement is shown in Figs. 4 and 5 of the drawings, and details of these appear in Figs. 7 and 8. The principal distinction between the hereinbefore described form and that now under consideration lies in the replacement of the single contact member 26 of the foregoing form by two elongated contact members 40 and 41. Essentially, the remaining components of the transducer are identical with those previously described. Therefore, in the interest of clarity, the same reference numerals have been primed and applied in Figs. 4, 5, 7 and 8 to those parts which are the same as those hereinbefore set forth. The major portions of brushes 40, 41 extend in generally side-by-side relation along brush support arm 25' and through apertures formed in fulcrum studs 29', 29'', respectively. The left-hand end of the brush 40 (as seen in the drawings) is conductively connected to an anchor lug 28' to which one extremity of hair-spring 33' is connected. The other end of spring 33' is connected to terminal 34'. The left-hand end of brush member 41 is conductively connected to an anchor 42 which in turn is electrically connected to lug 28', and thence through the spring 33' to the terminal 34'. The brushes 40, 41 have respective coiled portions 45, 46 formed therein serving resiliently to bias the free extremities thereof into contact with conjugate points on the bare edge of wire winding 35'.

As indicated in Figs. 4 and 5, and as clarified in the representations of Figs. 7 and 8, the two brushes have the following respective conformations: The brush 40 is bent upward, and overlies a portion of brush 41 just to the left of slide-wire 12' as seen in Figs. 4 and 5. Progressing along the brush members toward the free extremities thereof, it is seen that brush 40 has a downwardly bent portion making contact with a turn of the winding 35' on a radius $a$ (indicated in Fig. 8) passing through the axis of curvature of the cylindrically conformed edge of the winding form, and then extends horizontally through the slot in the guide member 31', carried on the end of the brush-arm 25'. Considering now the brush member 41, it will be seen that from its coiled portion 46 it extends toward the right as viewed in the drawings, below the overlying portion of brush 40, then is turned upwardly and crosses over in front of brush 40 so as to make contact with the same turn of the wire winding 35' as is engaged by brush 40, and on a radius $b$ passing through the axis of curvature of the cylindrically conformed edge of the winding surface 36, and angularly displaced from the radius $a$. The radii $a$ and $b$ lie in a common vertical plane which may include the axis of rotation of the brush-arm 25' and whose edge elevation is indicated by the line 8—8 in Fig. 7. Thus, the points of contact of the respective brushes with the resistance winding are separated only by a distance representing the angle between said radii—obviously a negligible portion of the total length of wire in the winding 35'—and are therefore at a common electrical potential relative to the respective extremities of the slide-wire. Thus, there has been provided a novel form of construction wherein the possibility of malfunctioning due to contact trouble with a single brush is substantially reduced by the addition of a further brush, and the two brushes, while bearing upon substantially equipotential points are rendered non-interfering in their performance. Furthermore, with the construction which has been described it is a relatively simple matter to measure the contact pressure exerted by either brush member by lifting it off the slide-wire with a light spring-balance; and this pressure may be adjusted to an optimum value by straining the coiled portions of the brush members by means of small pliers or other suitable tools.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A mechanical-electrical transducer, comprising a supporting frame member, a conductive resistor insulatively mounted on said frame member and presenting an elongated conductive surface, circuit means connected to said conductive resistor, an elongated brush support arm movably mounted on said frame member with one portion thereof adjacent to but spaced from said elongated surface and movable along a path substantially parallel to said surface, at least one elongated resilient conductive contact brush supported on and extending generally parallel with and along substantially the entire length of said brush support arm, said conductive contact brush being of relatively small diameter resilient wire and having a portion remote from one end thereof biased against said surface and in electrical contact therewith, said portion of said contact brush being constrained to follow said brush support arm along said path but free to flex in a direction substantially normal to said surface, circuit means connected to said one end of said contact brush, and sensing means responsive to a variable condition and connected to said brush support arm for moving said one end portion thereof along said path in accordance as said condition deviates from a datum level, whereby said portion of said contact brush engages said conductive resistor winding at a point thereof corresponding to the instantaneous value of said variable condition.

2. A mechanical-electrical transducer, comprising a supporting frame member, a wound wire resistor insulatively mounted on said frame member and presenting an elongated surface formed by the closely spaced wire turns thereof, circuit means connected to the opposite ends of said wound wire resistor, an elongated brush support arm, means forming a pivot for and insulatively supporting said brush support arm on said frame member for rotation about an axis with one end portion of the brush support arm adjacent to but spaced from said elongated surface and movable along a path substantially parallel to said elongated surface on rotation of said brush support arm, at least one elongated resilient contact brush supported on and extending along substantially the entire length of said brush support arm and toward said wire resistor, circuit means connected to said contact brush adjacent to said pivot, said contact brush biasing a portion thereof remote from said pivot against said elongated surface and into electrical contact therewith, means constraining said portion of said contact brush to follow said brush support arm in its movement along said path but leaving the same free to flex in a direction substantially normal to said surface, sensing means responsive to a variable condition and for rotating said brush support arm and moving said one end portion thereof along said path in accordance as said condition deviates from a datum level, whereby said portion of said contact brush engages said wire resistor at a point therealong corresponding to the instantaneous value of said variable condition.

3. A mechanical-electrical transducer, comprising a supporting frame member, a wound wire resistor insulatively mounted on said frame member and presenting an elongated surface formed by the closely spaced wire turns thereof, circuit means connected to the opposite ends of said wound wire resistor, an elongated brush support arm rotatably mounted on said frame member and insulated therefrom with one end portion thereof adjacent to but spaced from said elongated surface and movable along a path substantially parallel to said elongated surface on rotation of said brush support arm, at least one elongated resilient contact brush supported on and extending along substantially the entire length of said brush support arm and toward said wire resistor, circuit means connected to said contact brush adjacent to one end thereof, a fulcrum stud mounted on said brush support arm and engaging said contact brush remote from the other end thereof, the portion of said contact brush extending from said fulcrum stud toward said wire resistor being self-biased and resiliently engaging said wire resistor, said portion of said contact brush being constrained to follow said brush support arm in its movement along said path but being free to flex in a direction substantially normal to said surface, sensing means responsive to a variable condition and for rotating said brush support arm and moving said one end portion thereof along said path in accordance as said condition deviates from a datum level, whereby said portion of said contact brush engages said wire resistor at a point therealong corresponding to the instantaneous value of said variable condition.

4. A mechanical-electrical transducer, comprising a supporting frame member, a wound wire resistor insulatively mounted on said frame member and presenting an elongated surface formed by the closely spaced wire turns thereof, circuit means connected to the opposite ends of said wound wire resistor, an elongated brush support arm rotatably mounted on said frame member and insulated therefrom with one end portion thereof adjacent to but spaced from said elongated surface and movable along a path substantially parallel to said elongated surface on rotation of said brush support arm, two elongated resilient contact brushes each extending along substantially the entire length of said brush support arm toward said wire resistor, circuit means connected to each of said contact brushes adjacent to corresponding ends thereof, fulcrum means mounted on said brush support arm and engaging said contact brushes remote from the other ends thereof, the portion of each of said contact brushes extending from said fulcrum means toward said wire resistor being self-biased with each resiliently engaging said wire resistor at closely spaced points, said portions of said contact brushes being constrained to follow said brush support arm in its movement along said path but being free to flex in a direction substantially normal to said surface, sensing means responsive to a variable condition mounted on said frame member and for rotating said brush support arm and moving said one end portion thereof along said path in accordance as said condition deviates from a datum level, whereby said portions of said contact brushes each engage said wire resistor at substantially equivalent points therealong corresponding to a given value of said variable condition.

5. A mechanical-electrical transducer, comprising a supporting frame member, a wound wire resistor insulatively mounted on said frame member and presenting an elongated surface formed by the closely spaced wire turns thereof, circuit means connected to the opposite ends of said wound wire resistor, an elongated brush support arm rotatably mounted on said frame member and insulated therefrom with one end portion thereof adjacent to but spaced from said elongated surface and movable along a path substantially parallel to said elongated surface on rotation of said brush support arm, at least one elongated resilient contact brush supported on and extending along substantially the entire length of said brush support arm and toward said wire resistor, circuit means connected to said contact brush adjacent to one end thereof, a fulcrum stud mounted on said brush support arm and engaging said contact brush remote from the other end thereof, a guide member connected to said one end portion of said brush support arm adjacent said wire resistor and having an elongated slot formed therein extending in a direction substantially normal to said elongated surface of said wire resistor, the portion of said contact brush extending from said fulcrum stud toward said wire resistor being self-biased and resiliently engaging said wire resistor, said portion of said contact brush extending in said slot adjacent to said wire resistor and being constrained thereby to follow said brush support arm in its movement along said path but being free to flex in a direction substantially normal to said surface, sensing means responsive to a variable condition mounted on said frame member and for rotating said brush support arm and moving said one end portion thereof along said path in accordance as said condition deviates from a datum level, whereby said portion of said contact brush engages said wire resistor at a point therealong corresponding to the instantaneous value of said variable condition.

6. A mechanical-electrical transducer, comprising a supporting frame member, a wound wire resistor insulatively mounted on said frame member and presenting an elongated surface formed by the closely spaced wire turns thereof, circuit means conected to the opposite ends of said wound wire resistor, an elongated brush support arm rotatably mounted on said frame member and insulated therefrom with one end portion thereof adjacent to but spaced from said elongated surface and movable along a path substantially parallel to said elongated surface on rotation of said brush support arm, two elongated resilient contact brushes each extending along substantially the entire length of said brush support arm toward said wire resistor, circuit means connected to each of said contact brushes adjacent to corresponding ends thereof, fulcrum means mounted on said brush support arm and engaging said contact brushes remote from the other ends thereof, a guide member connected to said one end portion of said brush support arm adjacent said wire resistor and having an elongated slot formed therein extending in a direction normal to said elongated surface of said wire resistor, the portions of each of said contact brushes extending from said fulcrum means toward said wire resistor being self-biased with each resiliently engaging the same turn of said wire resistor at closely spaced points, said portions of said contact brushes extending in spaced relation in said slot adjacent to said wire resistor and each being constrained thereby to follow said brush support arm in its movement along said path but being free to flex in a direction substantially normal to said surface, sensing means responsive to a variable condition mounted on said frame member and for rotating said brush support arm and moving said one end portion thereof along said path in accordance as said condition deviates from a datum level, whereby said portions of said contact brushes each engage said wire resistor at substantially equivalent points thereof corresponding to a given value of said variable condition.

7. In a measuring device, a wound wire resistor presenting an elongated surface formed by bare portions of the closely spaced wire turns thereof, an elongated movable brush support arm having one end portion thereof extending adjacent to but spaced from said elongated surface and movable along a path substantially parallel to said elongated surface, means forming a pivot for said brush support arm adjacent to the other end thereof, at least one elongated resilient contact brush supported on and extending substantially along the entire length of said brush support arm and toward said wire resistor, circuit means connected to said contact brush adjacent to said pivot, said contact brush having a portion thereof remote from said pivot self-biased against and in electrical contact with said elongated surface, means constraining said portion of said contact brush to follow said end portion of said brush support arm when it moves along said path but leaving the same free to flex in a direction substantially normal to said surface, and electrical circuit means connected to said wire resistor.

8. In a measuring device, a wound wire resistor presenting an elongated surface formed by bare portions of the closely spaced wire turns thereof, an elongated movable brush support arm, means forming a pivot for said brush support arm adjacent to one end thereof, said brush support arm having the other end portion thereof extending adjacent to but spaced from said elongated surface and movable along a path substantially parallel to said elongated surface, a guide member connected to said other end portion of said brush support arm and having an elongated slot formed therein extending in a direction substantially normal to said elongated surface, at least one elongated resilient contact brush supported on and extending substantially along the entire length of said brush support arm and toward said wire resistor, circuit means connected to said contact brush adjacent to said pivot, said contact brush having a portion thereof remote from said pivot self-biased against and in electrical contact with said elongated surface, said portion of said contact brush extending in said slot and being constrained thereby to follow said end portion of said brush support arm when it moves along said path but free to flex in a direction substantially normal to said surface, and electrical circuit means connected to said wire resistor.

9. In a measuring device, a wound wire resistor presenting an elongated surface formed by bare portions of the closely spaced wire turns thereof, an elongated movable brush support arm having one end portion thereof extending adjacent to but spaced from said elongated surface and movable along a path substantially parallel to said elongated surface, two elongated resilient contact brushes supported on and extending substantially along the entire length of said brush support arm and toward said wire resistor, said contact brushes each having a portion thereof self-biased against and in electrical contact with closely spaced points on the same wire turn of said elongated surface, means constraining said portions of each of said contact brushes to follow said end portion of said brush support arm when it moves along said path but leaving the same free to flex individually in a direction substantially normal to said surface, and electrical circuit means connected to said wire resistor and to each of said contact brushes.

10. In a measuring device, a wound wire resistor presenting an elongated surface formed by bare portions of the closely spaced wire turns thereof, an elongated movable brush support arm having one end portion thereof extending adjacent to but spaced from said elongated surface and movable along a path substantially parallel to said elongated surface, a guide member connected to said one end portion of said brush support arm and having an elongated slot formed therein extending in a direction substantially normal to said elongated surface, fulcrum means on said brush support arm intermediate the ends thereof, two elongated resilient contact brushes supported on and extending substantially along the entire length of said brush support arm, each of said contact brushes being anchored by said fulcrum means intermediate the ends thereof and extending therefrom toward said elongated surface and through said slot in spaced relation, the portion of each of said contact brushes intermediate said fulcrum means and said guide means being self-biased and resiliently engaging closely spaced points on the same turn of said wire resistor, said guide member constraining each of said contact brushes to follow said end portion of said brush support arm when it moves along said path but leaving the same free to flex individually in a direction substantially normal to said surface, and electrical circuit means connected to said wire resistor and to each of said contact brushes.

11. In a transducer for varying the resistance in an electrical circuit in correspondence with the displacement of a movable member, the combination of a resistor element having a cylindrically conformed contact surface, a brush-carrying structure movable with displacement of said movable member and in a sense substantially parallel to the axis of curvature of said cylindrical surface, a plurality of individual brush members borne by said structure and disposed to make substantially point contacts with said surface at respective conjugate points lying in a plane perpendicular to said axis of curvature but having mutual angular displacement about said axis, said brush members being independently deflectable in said plane, means for constraining displacement of said brush members relative to said structure except in a sense parallel to said plane, and means separately influencing said individual members for resiliently and independently maintaining the same in engagement with said surface at said points.

12. In a transducer for varying the resistance in an electrical circuit in correspondence with the angular displacement of a movable member about an axis, the combination of a resistor element with a toroidally conformed contact surface having its major axis of curvature substantially coinciding with said axis of displacement, a brush-carrying structure rotatable about said axis and in a plane perpendicular thereto, a plurality of individual brush members borne by said structure and disposed to make substantially point contacts with said surface at respective conjugate points lying in a plane containing said axis but having mutual angular displacement about the minor axis of curvature of said toroidal surface, said brush members being independently deflectable in said plane, means for constraining displacement of said brush members relative to said structure except in a sense parallel to said plane, and means separately influencing said individual members for resiliently and independently maintaining the same in engagement with said surface at said points.

13. In a transducer for varying the resistance in an electrical circuit in correspondence with the displacement of a movable member, the combination of a resistor element having a cylindrically conformed contact surface, a brush-carrying structure movable with displacement of said movable member and in a sense substantially parallel to the axis of curvature of said cylindrical surface, a plurality of resilient wire brushes borne by said structure and extending substantially perpendicularly to the sense of motion of said structure and conformed to engage said surface at respective conjugate points lying in a plane perpendicular to said axis of curvature but having mutual angular displacement about said axis, means for constraining displacement of said brushes relative to said structure except in a sense parallel to said plane, said brushes being by their resiliency maintained in engagement with said surface at said respective conjugate points.

14. In a transducer for varying the resistance in an electrical circuit in correspondence with the displacement of a movable member, the combination of a resistor element having a cylindrically conformed contact surface, a brush-carrying structure movable with displacement of said movable member and in a sense substantially parallel to the axis of curvature of said cylindrical surface, a plurality of resilient wire brushes borne by said structure and extending substantially perpendicularly to the sense of motion of said structure and on one side of said resistor element having respective portions mutually displaced in a sense perpendicular both to said axis and to their extended direction and on the other side of said resistor element having portions mutually displaced in a similar sense but transposed, the transposition being effected through diagonally disposed portions of said brushes engaging said contact surface at respective conjugate points lying in a plane perpendicular to said axis of curvature but having mutual angular displacement about said axis, means for constraining displacement of said brushes relative to said structure except in a sense parallel to said plane, said brushes being by their resiliency maintained in engagement with said surface at said respective conjugate points.

15. In a transducer for varying the resistance in an electrical circuit in correspondence with the displacement of a movable member, the combination of a resistor element having a cylindrically conformed contact surface, a brush-carrying structure movable with displacement of said movable member and in a sense substantially parallel to the axis of curvature of said cylindrical surface, a plurality of resilient wire brushes borne by said structure and extending substantially perpendicularly to the sense of motion of said structure and on one side of said resistor element having respective portions mutually displaced in a sense perpendicular both to said axis and to their extended direction and on the other side of said resistor element having portions displaced in a similar sense but transposed, the transposition being effected through obliquely disposed portions of said brushes which join portions of each of the respective brushes on opposite sides of said resistor element mutually displaced in a sense parallel to said axis, said obliquely disposed brush portions engaging said contact surface at respective conjugate points lying in a plane perpendicular to said axis of curvature but having mutual angular displacement about said axis, means for constraining displacement of said brushes relative to said structure except in a sense parallel to said plane, said brushes being by their resiliency maintained in engagement with said surface at said respective conjugate points.

References Cited in the file of this patent

UNITED STATES PATENTS

| | | |
|---|---|---|
| 2,179,566 | Stoekle | Nov. 14, 1939 |
| 2,379,530 | Lederer | July 3, 1945 |
| 2,550,041 | Cozzolino et al. | Apr. 24, 1951 |
| 2,622,177 | Klose | Dec. 16, 1952 |